(No Model.) 7 Sheets—Sheet 1.

J. W. CLARK.
CASH INDICATOR AND REGISTER.

No. 422,878. Patented Mar. 4, 1890.

Fig. I.

Witnesses
W. R. Edelin
Geo. W. King

Inventor
James W. Clark
By Leggett & Leggett
Attys.

(No Model.)

J. W. CLARK.
CASH INDICATOR AND REGISTER.

No. 422,878. Patented Mar. 4, 1890.

Fig. 2.

Witnesses.
W. R. Edelen
Geo. W. King

Inventor
James W. Clark.
By Leggett & Leggett
Att'ys (No Model.)  7 Sheets—Sheet 4.
J. W. CLARK.
CASH INDICATOR AND REGISTER.

No. 422,878.  Patented Mar. 4, 1890.

Witnesses.
W. R. Edelen.
Geo. W. King.

Inventor.
James W. Clark
By Leggett & Leggett
Att'ys.

(No Model.) 7 Sheets—Sheet 5.
J. W. CLARK.
CASH INDICATOR AND REGISTER.

No. 422,878. Patented Mar. 4, 1890.

Witnesses
W. R. Edelen
Geo. W. King

Inventor
James W. Clark
By Leggett & Leggett
Att'ys (No Model.)  7 Sheets—Sheet 6.

J. W. CLARK.
CASH INDICATOR AND REGISTER.

No. 422,878.  Patented Mar. 4, 1890.

Witnesses
W. R. Edelen
Geo. W. King

Inventor.
James W. Clark
By Leggett & Leggett
Att'ys

(No Model.) 7 Sheets—Sheet 7.

J. W. CLARK.
CASH INDICATOR AND REGISTER.

No. 422,878. Patented Mar. 4, 1890.

Witnesses
W. R. Edelen.
Geo. W. King

Inventor
James W. Clark
By Leggett & Leggett
Att'ys

UNITED STATES PATENT OFFICE.

JAMES W. CLARK, OF ETNA, OHIO, ASSIGNOR, BY DIRECT AND MESNE ASSIGNMENTS, TO THE CLARK CASH REGISTER COMPANY.

CASH INDICATOR AND REGISTER.

SPECIFICATION forming part of Letters Patent No. 422,878, dated March 4, 1890.

Application filed February 28, 1889. Serial No. 301,447. (No model.)

*To all whom it may concern:*

Be it known that I, JAMES W. CLARK, of Etna, in the county of Licking and State of Ohio, have invented certain new and useful Improvements in Cash-Registers; and I do hereby declare the following to be a full, clear, and exact description of the invention, such as will enable others skilled in the art to which it pertains to make and use the same.

My invention relates to improvements in cash-registers; and it consists in certain features of construction and in combination of parts, hereinafter described, and pointed out in the claims.

In the accompanying drawings.

Figure 1:
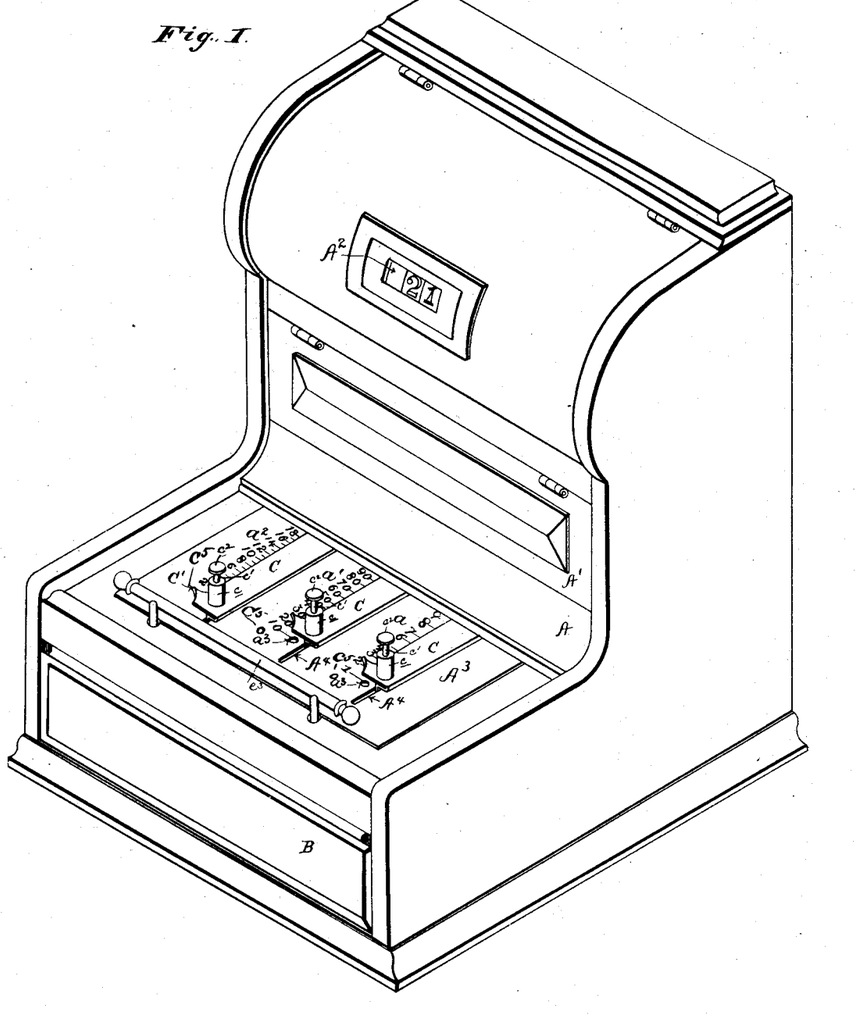
Figures 1 and 2 are perspectives, portions of the latter being broken away to show the internal construction.
Figure 2:
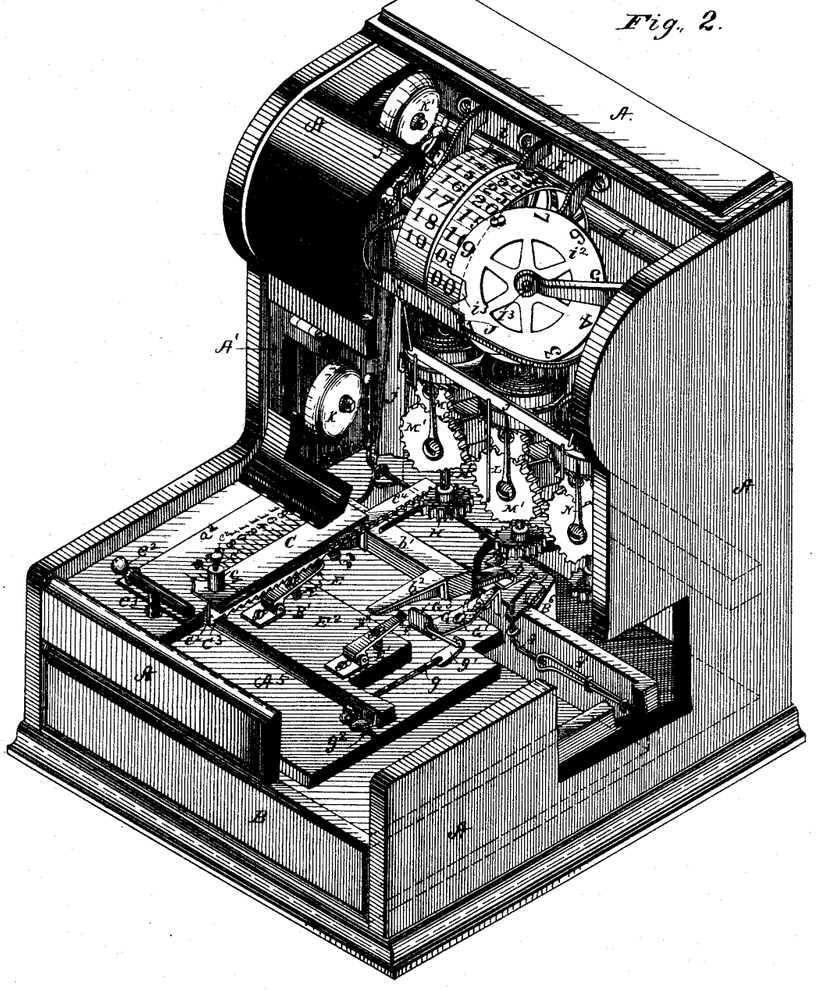

A represents the casing, the form thereof being shown more clearly in Figs. 1 and 2. The upright section of the casing has a door $A'$, by opening which the registering-wheels may be seen, showing the cash-receipts for the day, week, month, or other length of time, as the case may be; also, a sight-hole $A^2$, through which is seen one line of figures on the indicating-wheels, showing the amount of each successive purchase. The horizontal portion of the casing (shown projecting forward from the upright part) serves as a table or key-board, whereon the keys C are located; also is shown a cash-drawer B, opening forward. The three keys C are substantially alike. These keys slide rearward and back, and each key has a pointer $C'$, that traverses, respectively, the adjacent scales $a$, $a'$, and $a^2$. The right-hand scale $a$ represents cents and is marked from 1 to 9, increasing rearward.

The central scale is for registering nickels, and is numbered 10, 20, 30, and so on. I prefer, however, to number the scale $a'$ from 5 to 95; but sometimes for want of room only alternate lines are numbered, as shown in Fig. 1. The left-hand scale $a^2$ represents dollars, and is numbered 2, 4, 6, and so on, as far as there is room, the intervening or unnumbered lines representing the odd dollars.

In many branches of the retail trade—such, for instance, as saloons, groceries, drug-stores, cigar-shops, &c.—a large number of the purchases are for five cents, or for a multiple of five, and hence it is more convenient to have the divisions of scale $a'$ represent five cents each, whereby for registering a large number of the small purchases only the central key is used.

The cash-drawer B is opened by the action of the coil-spring $B'$, the drawer being closed by hand against the action of this spring. This spring is coiled loosely around rod $B^2$, the latter being fastened to the casing near the front and just above the drawer. One end of the spring $B'$ is secured to the rod $B^2$, which, as before stated, is fast, while the free end of the spring connects with loose spool $B^3$, on which latter is wound cord $B^4$, the end of the cord being attached to the rear wall of the drawer, with the arrangement such that the draft on the cord in closing the drawer gives tension to the spring, and the recoil of the spring opens the drawer, and the degree of tension of the spring is regulated by the length of cord.

For holding the drawer closed the rear wall thereof or an attachment of such rear wall is provided with catch $B^5$, that is engaged by dog $b$ when the drawer is in its closed position. The dog is connected with rock-bar $b'$, the latter being pivoted to the casing and extending crosswise under the line of keys C. Projecting forward from bar $b'$ are three rock-arms $b^2$, at least one of which latter is engaged by a spring $b^3$, for depressing the dog to its engagement with the catch. With such construction it is evident that by depressing either arm $b^2$ dog $b$ will be elevated, thereby releasing the cash-drawer.

Figure 3:
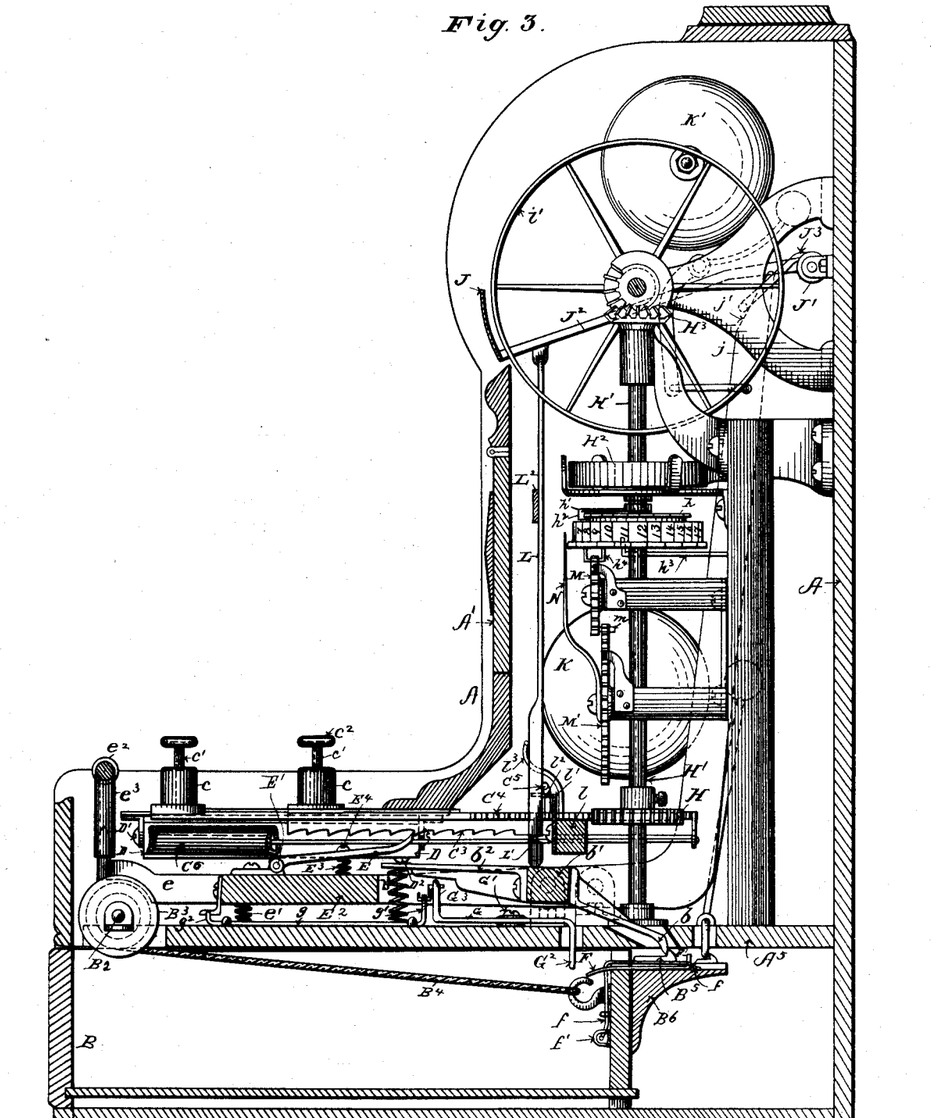
Fig. 3 is an elevation in longitudinal section.
Figure 7:
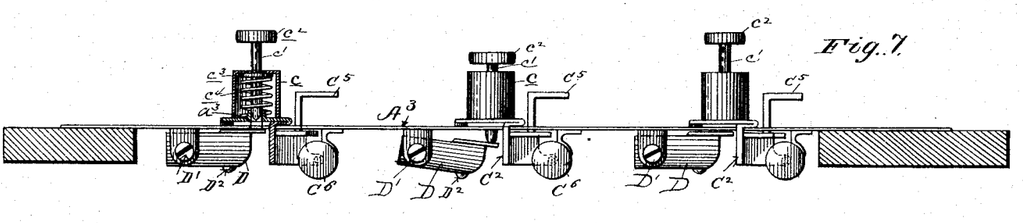
Fig. 7 is an elevation in transverse section of the table, the last three figures being on the same enlarged scale.

D are tilting plates, three in number, each plate being hinged or pivoted at the one edge thereof, respectively at D′, (see Figs. 3 and 7,) these plates extending lengthwise keys C, the free edge of each tilting plate extending along approximately under the central line of the key C above it, each plate D at or near the free edge thereof having a depending contact-point $D^2$ in position to engage the opposing rock-arm $b^2$. Each key C consists of a flat plate provided near the forward end thereof with an upwardly-projecting hollow cylindrical boss $c$ closed at the upper end, except a central hole, through which hole operates a small rod $c'$, the latter terminating above in a thumb-piece $c^2$. Inside the boss rod $c'$ is provided with a collar $c^3$. Below the collar and resting against the under side thereof is a coil-spring $c^4$, by the action of which the thumb-piece and rod are held normally elevated.

The metal table-top or key-board $A^3$, on which the different scales $a$, $a'$, and $a^2$ are marked, is provided with three series of holes $a^3$, each series of holes corresponding with the numbers of the next adjacent scale, these holes being adapted to receive loosely the lower section of rods $c'$, when the respective pointers are over the respective marks of the scale, and in such position of parts by depressing a thumb-piece $c^2$ the lower end of the connected rod $c'$ engages and depresses the opposing tilting plate D, whereby dog $b'$ is elevated and the cash-drawer flies open. It is evident, therefore, that when each or all of the keys C are advanced from the zero-point $C^5$, by pressing on the thumb-piece of any one of the advanced keys the drawer will open; but as there are no holes $a^3$ opposite the zero-point of the scale the drawer cannot be opened, except by first advancing at least one key.

Plate $A^3$ has long slots $A^4$, in which operate, respectively, depending flanges $C^2$ of the respective keys C, each flange having ratchet-teeth $C^3$ presenting forward for engaging, respectively, retaining-pawls E. These pawls are pivoted, respectively at E′ to a cross-bar $E^2$, with a spring $E^3$ for elevating the free end of the pawl to its engagement with the ratchet-teeth aforesaid, and retaining-screws $E^4$ for limiting the action of the spring, whereby by depressing cross-bar $E^2$ all the pawls are simultaneously depressed from the ratchet-teeth; but with the cross-bar in its normal or elevated position the pawls operate the same as ordinary spring-actuated pawls. Cross-bar $E^2$ is rigidly attached at either end to long levers $e$, these levers being pivoted near the rear side of the casing and extending from thence well forward. The cross-bar and these levers constitute a rigid frame, with one or more springs $e'$ engaging the under side of the cross-bar for holding the frame in its normal or elevated position. Rod or hand-piece $e^2$, sometimes called a "trip-bar," is located above the table and extends along near the front edge of the table, this rod having depending arms $e^3$ extending loosely through holes in the table. Arms $e^3$ engage, respectively, levers $e$, and by depressing rod $e^2$ by hand the retaining-pawls E are, as aforesaid, simultaneously depressed and disengaged from the opposing ratchet-teeth. In this connection I will state that the respective keys C are provided with rack-bars $C^4$ extending rearward for actuating the registering and indicating mechanism hereinafter described, and connected with such mechanism are springs by the action of which keys C, when released by the retaining-pawls, are instantly returned forward to the place of beginning, or zero-mark, each key having attached a dash-pot C to cushion the key at its forward terminal.

To recapitulate, after any or all of the keys have been moved rearward, by depressing any one of the thumb-pieces connected with such rearwardly-advanced key or keys, the drawer is released and flies open, after which, by depressing hand-piece $e^2$, the keys are turned forward to their normal position or place of beginning.

For purposes hereinafter mentioned the cash-drawer is supposed to have been closed before the keys are returned forward by the action of the hand-piece $e^2$, as aforesaid.

Door A′ is supposed to be kept closed and locked, the proprietor retaining the key, and consequently the registering and indicating apparatus cannot be tampered with.

Figure 4:
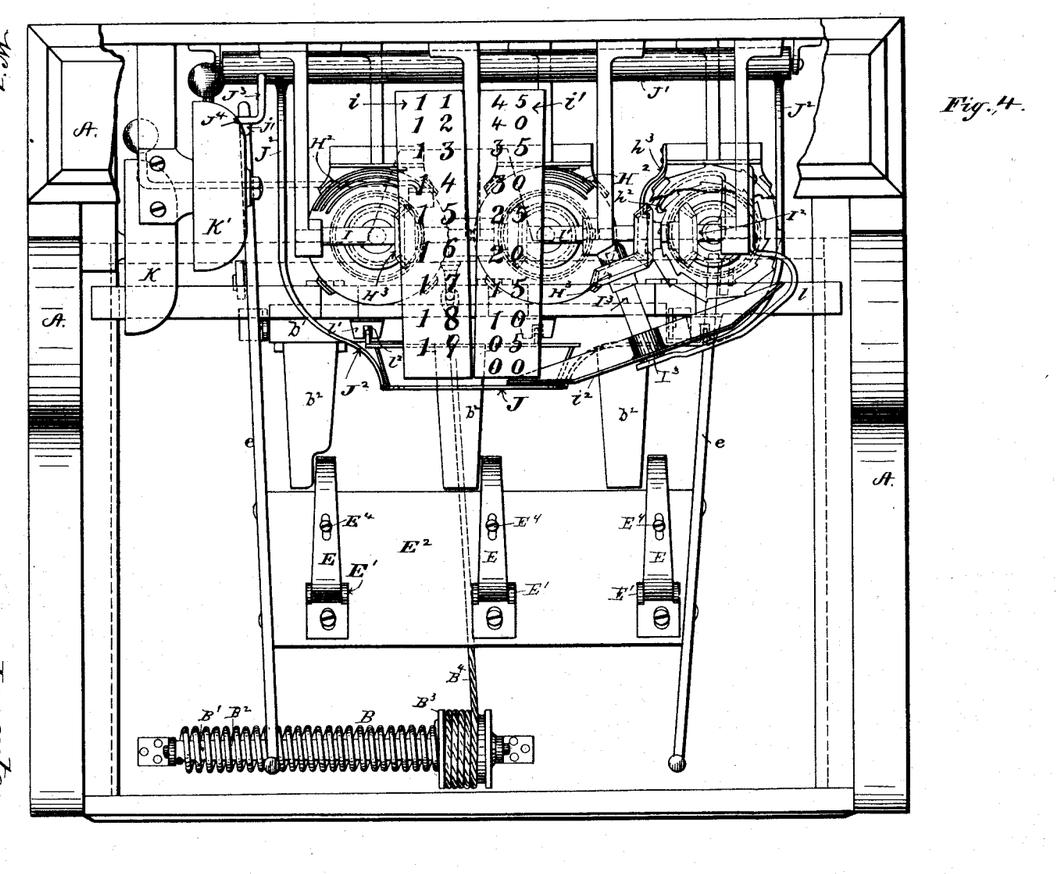
Fig. 4 is a plan with the key-board or table-top removed.
Figure 5:
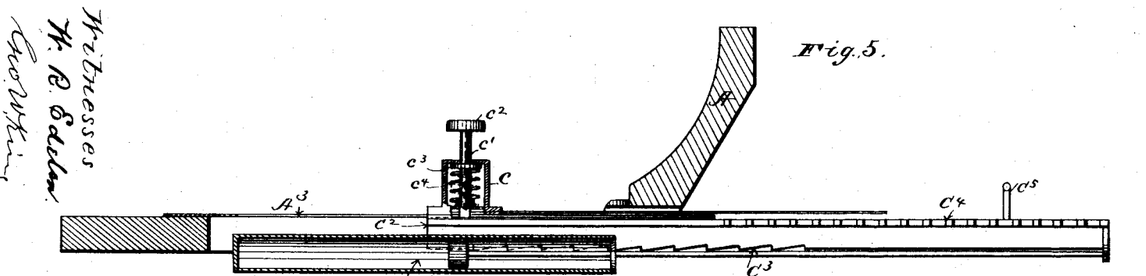
Fig. 5 is an enlarged elevation, in section, of the table taken lengthwise of the key.
Figure 6:
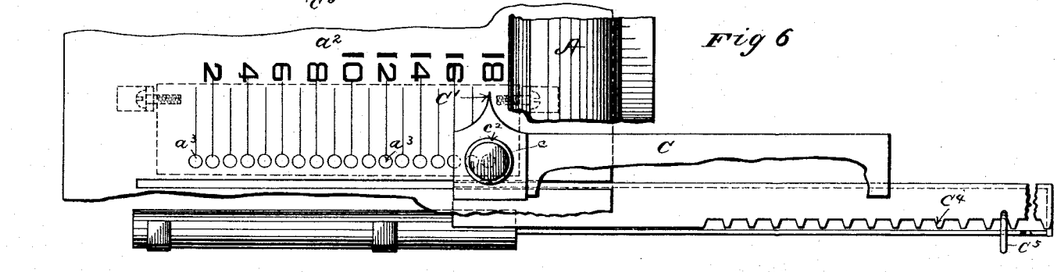
Fig. 6 is a plan of a portion of the table-top or key-board.

To prevent the drawer being opened a second time without first returning the keys to their normal position or zero-point, I provide as follows, to wit: $B^6$ is merely a block or shelf attached to the rear wall of the drawer for supporting the catches and plate F. This plate has an upwardly-projecting toe or lug F′, against which toe bears wire $f$. The wire extends along above the plate forward and obliquely to the right hand, as shown in Figs. 10, 11, 12, and 13, and from thence passes down loosely through a hole in the front end of the plate, and from thence turns to the right hand, where it is engaged by a spring $f'$, by the action of which spring the free or rear end of the wire is yieldingly held against toe F′, wire $f$ being substantially in the form of a bell-crank lever. Just above the drawer is located shelf $A^5$, the same being an attachment of the casing. G is a plate pivoted about midway thereof, at G′, to the shelf, so as to swing in a horizontal plane, the plate extending forward and rearward of the pivot, the rear end of the plate having a depending arm $G^2$, adapted to engage wire $f$ while the drawer is being opened or closed, arm $G^2$ being perhaps an inch or two forward of wire $f$ when the drawer is in position closed. Plate G in its normal position extends alongside the central rock-arm $b^2$, but on a lower plane than the rock-arm. The forward end of plate G has an upwardly-projecting toe $G^3$, adapted to fit under and block rock-arm $b^2$ when plate G is turned on its axis in the one direction, plate G being held from turning in the opposite direction by a stop hereinafter mentioned. While the drawer is moving forward to its open position, the wire $f$ engages arm $G^2$ on the right-hand side of the latter, the wire being snubbed back by such engagement, plate G being held stationary meantime by its stop. Wire $f$, after passing arm G, is returned by the action of spring $f'$ to its place bearing against lug F'. While the drawer is being closed, wire $f$, by reason of its position oblique with the line of motion of the drawer, engages arm $G^2$ on the left-hand side of the latter, in which position of parts the wire being held stationary by means of lug F', arm $G^2$ is moved to the right hand by the passing wire, thus moving toe $G^3$ in the opposite direction and under arm $b^2$, thereby blocking the latter, in which position of parts the drawer cannot be opened a second time, for the reason that dog $b$ cannot be elevated. Rock-shaft $g$ at the extremes thereof has upright and lateral rock-arms, respectively, $g'$ and $g^2$, the former being connected by links $g^3$ with toe $G^3$. Arms $g^2$ extend under cross-bar $E^2$, and by depressing the latter rock-shaft $g$ is actuated in the direction to withdraw the toe $G^3$ from under arm $b^2$, after which the drawer may be unfastened by depressing any one of the thumb-knobs $c^2$ aforesaid. Arm $g^2$, in its normal or depressed position, rests on shelf $A^5$, and in such position the shelf constitutes the stop aforesaid that limits the movement of plate G in the one direction, plate G, when thus stopped by the engagement of arm $g^2$ with the shelf, being in position approximately parallel with the line of arm $b^2$. With such construction, the keys having been advanced rearward to indicate and register the purchase-money and the drawer having been opened and closed in making the change, the drawer cannot again be opened except each and all of the keys have first been returned to 0. As aforesaid, each key C has attached a rack-bar $C^4$, the respective rack-bars engaging pinions H, mounted, respectively, on upright spindles H'. Each spindle is provided with a main spring $H^2$, these springs being strained, respectively, by moving the connected keys rearward, the recoil of the springs returning the respective keys forward to 0. The different spindles at the upper ends thereof are provided with beveled pinions $H^3$. These pinions engage corresponding pinions mounted, respectively, on shafts I, I', and $I^2$. (See Fig. 4.) The left-hand shaft I bears indicator-wheel $i$, the latter having numerals marked on the periphery thereof, corresponding with the scale of the left-hand key C, indicating dollars. Shaft I' bears wheel $i'$, this wheel having numerals on the periphery thereof corresponding with the scale of the central key C. Shaft $I^2$ is intergeared with shaft $I^3$, the latter bearing wheel $i^2$, this wheel having figures on the periphery corresponding with the scale of the right-hand key C. The rim of wheel $i^2$ overlaps the rim of wheel $i'$ so far as to conceal the right-hand line of figures on wheel $i'$, as seen through the sight-hole. Wheel $i^2$ is cut away or notched at $i^3$, where the zero-mark of the wheel should occur. In the normal position of wheel $i^2$—that is to say, with the right-hand key at 0—notch $i^3$ is opposite the sight-hole, and consequently does not hide any figure on wheel $i'$ that may be opposite the sight-hole.

In operating the device, supposing the amount of the purchase is eight dollars and seventy-five cents, in which case the left-hand key C is advanced rearward until the pointer thereof is opposite figure 8 on the accompanying scale, whereupon wheel $i$ will disclose figure 8 at the sight-hole, indicating eight dollars. The central key C is advanced until the pointer thereof is opposite 75 of the accompanying scale, whereupon wheel $i'$ will display figures 75 at the sight-hole, indicating cents. In this instance the right-hand key C is not used. If the number of cents be other than a multiple of five the right-hand key is used to indicate the odd cents. For instance, suppose the number of cents to be seventy-six, in which case the middle key C is moved to number 70 of the scale and the right-hand key is moved to 6 of its scale, whereupon figure 7 on wheel $i'$ and figure 6 on wheel $i^2$ will be displayed at the sight-hole. As shown more clearly in Fig. 4, shaft $I^3$ is set oblique to the line of shaft $I^2$, and wheel $i^2$ in such case has a conical rim; but this is a matter of construction, and is of no particular importance.

J is a blind, consisting usually of a plate of metal adapted to be elevated to a position opposite the sight-hole and in front of the indicating-wheel, in which position of the blind the figures on the indicating-wheel cannot be read through the sight-hole. In its normal or depressed position the blind is below the sight-hole and out of the way. The blind is elevated by depressing hand-piece $e^2$, aforesaid, and the blind is returned to its normal or depressed position by gravity when all of keys C are returned to 0. For this purpose the mechanism connected with the blind is as follows, to wit: J' is a horizontal rock-bar located near the back wall of the casing, from whence it is supported, this rock-bar extending along at the rear of the indicating-wheel and having attached a bail $J^2$. This bail bows forward in front of the indicator-wheels and has attached a blind J, aforesaid. Rock-bar J' has also attached a rock-arm $J^3$ projecting forward, the free end thereof being turned laterally at $J^4$. (See Fig. 4.) Of levers $e$, aforesaid, one lever is located approximately under rock-arm $J^3$, and has attached an upright arm $j$, the same terminating above in inclined or beveled end $j'$, this incline being adapted to engage the lateral member or wrist $J^4$ of the said rock-arm. By depressing hand-piece $e^2$, arm $j$ is tilted forward, causing incline $j'$ to engage and elevate member $J^4$, whereby bail $J^2$ and blind J are elevated, the latter being thus brought opposite the sight-hole. When hand-piece $e^2$ is left free, it, as aforesaid, is instantly raised to its normal position, whereby arm J is retired rearward, and for holding the bail and blind elevated after the retirement of arm $j$ the following mechanism is provided, to wit: From bail $J^2$ depend three slight rods or wires L, each extending down by the side of the respective rack-bars $C^4$, the lower section of each rod L being flattened and notched at L' on the rear edge of the flatted section. (See Fig. 3.) $L^2$ is merely a tie-bar connecting the different rods L and is not material, except that it steadies the rod. A cross-bar $l$, connected with the casing, extends along at the rear of rod L, this cross-bar having attached brackets $l'$ projecting forward, and having slots $l^2$ for receiving loosely the flatted sections of the respective rods L. When the blind is in its elevated position notches L' are opposite that portion of the respective brackets at the rear of the slots, and slight springs $l^3$, bearing against the forward side of the respective rods L, swing these rods rearward and cause the notches to engage the brackets, thus locking these rods and holding the blind elevated. It is evident that by thus locking any one of wires L the blind will be held elevated.

Each rack-bar $C^4$ is provided with a lateral pin or attachment $c^5$, extending across the line of the adjacent rods L, these pins being located so far rearward on the rack-bars that they are out of the way of rod L, except when keys C are at 0; but with the keys at 0 pins $c^5$ engage the opposing rods L and hold the latter so far forward that the notches L' are disengaged from the brackets, whereupon the blind descends by gravity to its normal or depressed position. It follows, then, that the blind, having been elevated, it will remain elevated so long as there is any one of the keys C that have not been returned to the zero-point.

It will be remembered that the chief function of hand-piece $e^2$ is to return the keys C to zero-point, and consequently the hand-piece is supposed to be used only after one or more of the keys have been advanced from the zero-point; but if the hand-piece is inadvertently depressed while all the keys are at 0 the blind will be elevated, but will instantly fall back when the hand-piece returns to its normal position, for the reason that rods L are held forward, as aforesaid, and notches L' are therefore inoperative.

Bells K and K' are provided with suitable mechanism shown for ringing the former when the cash-drawer is opened and for ringing the latter when hand-piece $e^2$ is depressed. Such devices are so well known that it is not considered necessary to describe them in detail, more especially as no claims are made to the bell mechanism.

Figure 8:
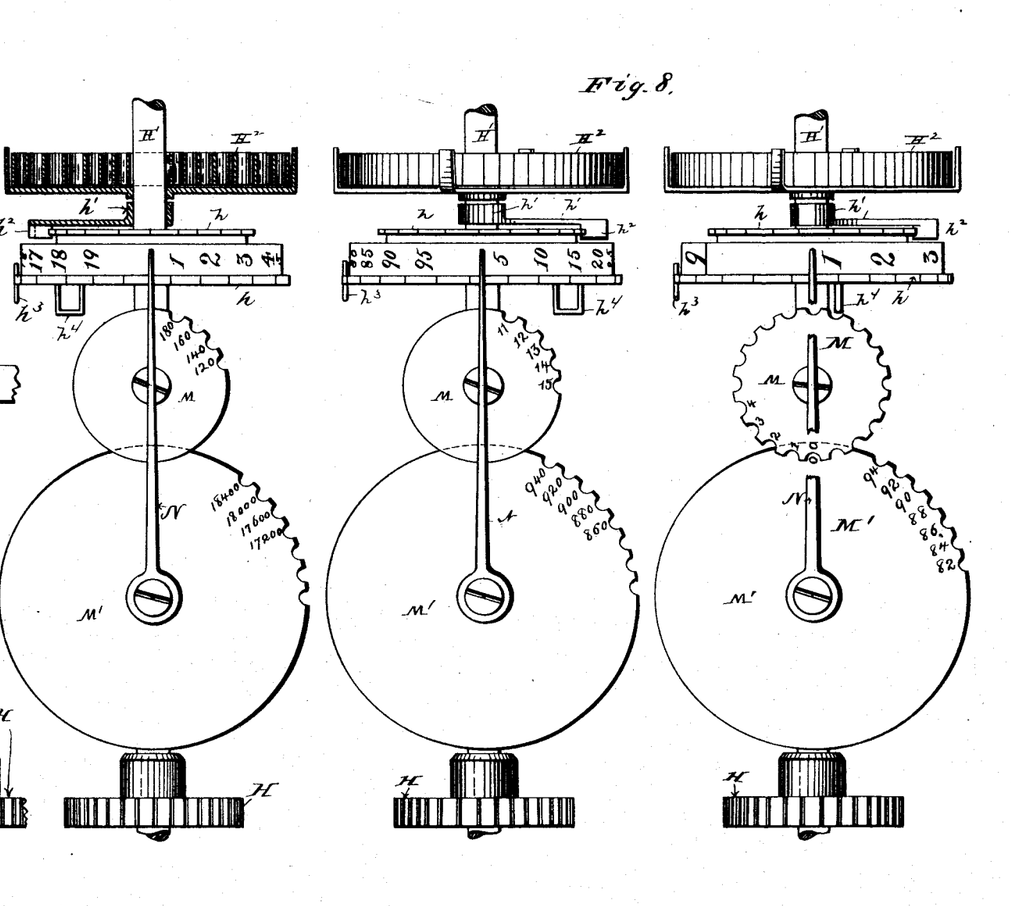
Fig. 8 is a front elevation of a series of three registering devices.
Figure 9:
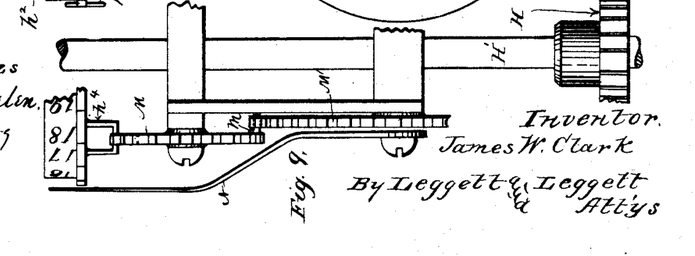
Fig. 9 is an end elevation of one of the registering devices.
Figure 10:
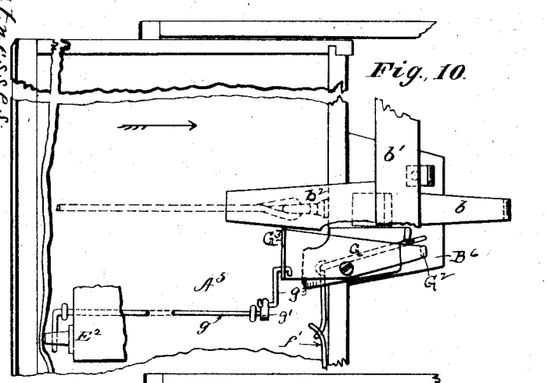
Figs. 10, 11, 12, and 13 are plans in detail of the cash-drawer mechanism, showing different working positions of the same.
Figure 11:
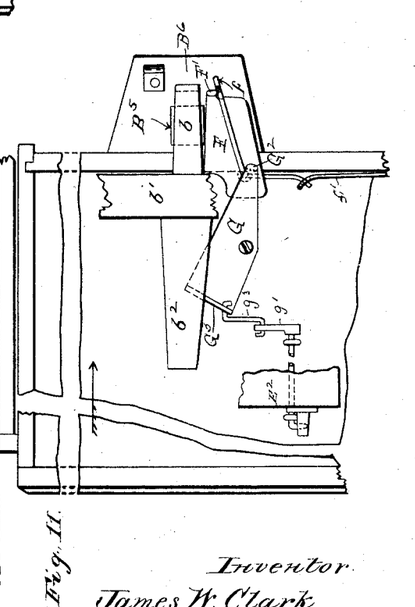
Figure 12:
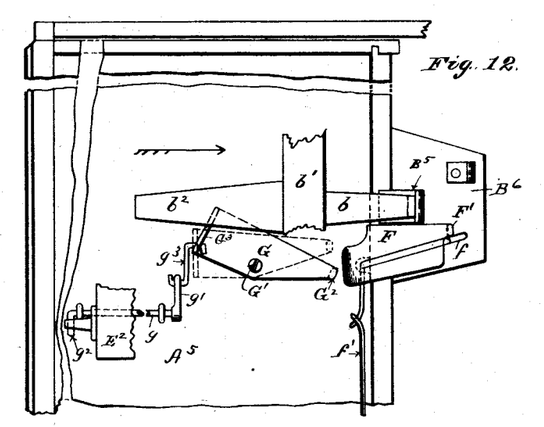
Figure 13:
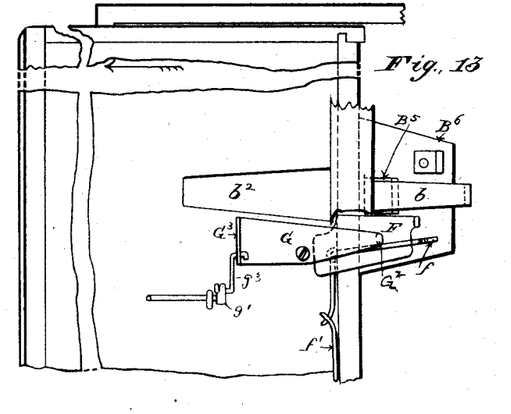

The registering device is as follows: Each spindle H' has journaled thereon a ratchet-wheel $h$, the teeth of which correspond in number with the divisions of the co-operating indicating wheel and scale. Each spindle H' has rigidly attached an arm $h'$, (see Fig. 8,) this arm bearing a spring-actuated pawl $h^2$ for engaging the teeth of the ratchet-wheel, whereby the ratchet-wheel is turned on its axis as many notches as the co-operating key C is advanced numbers on the accompanying scale. Retaining-pawls $h^3$ (see Fig. 3) are provided for holding the ratchet-wheels stationary during the reverse movements of the respective spindles. Each ratchet-wheel is provided with a projecting pin or point $h^4$, adapted once in a revolution of the ratchet-wheel to engage a tooth of the registering-wheel M next below and to move the latter wheel one tooth by each engagement. Below each wheel M is located a larger registering-wheel M', each wheel M having a pin $m$ (see Fig. 9) that in passing moves the adjacent wheel M' one notch. Other wheels may be arranged below to be operated by wheel M' in case it is desired to register large amounts. The different ratchet-wheels on the peripheries thereof and the different wheels M and M' on the faces thereof are numbered according to the notches of the respective wheels, the numbers reading or increasing in the direction opposite to which the wheels turn. Stationary pointers N, usually fastened to the respective axles of wheels M', extend up past the ratchet-wheels. The different wheels are set with 0 at the pointers, and consequently the amounts registered on each wheel will be read at the pointers. The aggregate amount registered on the different wheels will be the sum-total of cash receipts intrusted to the care of the machine.

What I claim is—

1. In a cash-register, the combination, with sliding keys each having a yielding thumb-piece, of registering and indicating mechanism actuated by the sliding keys, a cash-drawer, and mechanism actuated by the yielding thumb-piece for unlocking the cash-drawer.

2. In a cash-register, the combination, with sliding keys each carrying a yielding thumb-piece, of registering and indicator mechanism actuated by the sliding keys, springs for returning the keys to zero, a cash-drawer, and mechanism actuated by the yielding thumb-pieces for unlocking the cash-drawer.

3. In a cash-register, the combination, with registering and indicating mechanism, upright spindles for actuating said mechanism, and springs for moving said spindles in one direction, of sliding keys engaging said spindles for turning them in a direction opposite to the spring-pressure, and a casing having scales arranged at the sides of the keys, and a sight-hole through which are displayed figures on the indicator mechanism, substantially as set forth.

4. In a cash-register, the combination, with upright spindles, indicator-wheels actuated by said spindles, springs for turning the spindles in one direction, and sliding keys having teeth thereon for moving the spindles in the opposite direction, of a casing having scales arranged alongside of the keys and in a line with the direction of movement of the keys, also provided with a sight-hole through which are displayed figures on the indicator mechanism, substantially as set forth.

5. In a cash-register, the combination, with scales and co-operating sliding keys, of indicating-wheels actuated by the sliding keys and numbered to correspond with the respective scales, the indicator-wheel representing cents overlapping the face of the next adjacent wheel and having a notch at 0 whereby the figures of the rearward wheel are displayed through such notch, substantially as set forth.

6. In a cash-register, the combination, with upright spindles, indicating-wheels actuated thereby, springs for turning said spindles in one direction, ratchet-wheels journaled on the spindles, each ratchet-wheel being operatively connected with a registering-wheel, and arms rigidly secured to the spindles, of a casing having a sight-hole, through which are displayed the figures on the indicating-wheels, and also provided with scales arranged at the side of the keys, substantially as set forth.

7. In a cash-register, the combination, with cash-drawer and spring for opening the same, of a dog for holding the drawer closed, sliding keys, each key having a depressible thumb-piece, and transmitting mechanism for tripping the dog by the depression of the respective thumb-pieces, substantially as set forth.

8. In a cash-register, the combination, with a spring-actuated drawer and sliding keys, and a dog for holding the drawer closed against the action of the spring, said dog being attached to a rock-bar, the latter having rock-arms corresponding with the sliding keys, of tilting plates bearing upon the respective rock-arms, and thumb-knobs connected with the respective keys and bearing, respectively, on the tilting plate, whereby the dog is tripped by depressing the respective thumb-knobs, substantially as set forth.

9. In a cash-register, the combination, with sliding keys having ratchet-teeth, springs for returning the keys to 0, and spring-actuated pawls for holding the keys against the action of the returning-spring, of stops for limiting the action of the pawl-spring, the pawls being mounted on a tilting frame, by depressing which the pawls are simultaneously disengaged from the sliding keys, substantially as set forth.

10. In a cash-register, the combination, with a cash-drawer and dog, depressible frame, and connected hand-piece, of a tilting plate for locking the dog mechanism, a yielding incline connected with the drawer for actuating the tilting plate in the direction to lock the dog mechanism in closing the drawer, and connecting mechanism, substantially as indicated, for reversing such tilting plate by means of depressing the hand-piece, substantially as set forth.

11. In a cash-register, the combination, with sliding keys, tilting frame, sight-hole and blind, and an attachment of the tilting frame for elevating the blind, of spring-actuated catches connected with the blind mechanism for holding the blind elevated, and trips connected to the respective key attachments for respectively unfastening such catches, whereby the blind descends to its normal position by gravity, substantially as set forth.

In testimony whereof I sign this specification, in the presence of two witnesses, this 30th day of January, 1889.

JAMES W. CLARK.

Witnesses:
CHAS. H. DORER,
GEO. W. KING.